United States Patent [19]

Dunajtschik

[11] Patent Number: 5,238,494
[45] Date of Patent: Aug. 24, 1993

[54] COATING MACHINE WITH A ROTATABLY DRIVEN PERFORATED DRUM

[76] Inventor: Rudolf Dunajtschik, Flurstrasse 20 B, 8990 Lindau-Bodolz, Fed. Rep. of Germany

[21] Appl. No.: 792,306

[22] Filed: Nov. 14, 1991

[30] Foreign Application Priority Data

Nov. 17, 1990 [DE] Fed. Rep. of Germany ....... 4036668

[51] Int. Cl.$^5$ .............................................. B05C 5/00
[52] U.S. Cl. ........................................ 118/19; 118/20; 118/24; 118/64; 118/303; 34/133 L
[58] Field of Search ................. 118/19, 20, 24, 64, 118/303, 418; 34/133 J, 133 L, 133 N, 133 P, 133 Q

[56] References Cited

U.S. PATENT DOCUMENTS

| | | | |
|---|---|---|---|
| 3,228,117 | 1/1966 | Magnusson | 34/133 N |
| 3,357,398 | 12/1967 | Gross | 118/20 |
| 4,245,580 | 1/1981 | Okawara | 118/20 |
| 4,363,285 | 12/1982 | Yoshida et al. | 118/19 |
| 4,499,847 | 2/1985 | Dunajtschik | 118/19 |
| 4,516,333 | 5/1985 | Aoki et al. | 34/133 N |
| 4,586,457 | 5/1986 | Dunajtschik | 118/19 |
| 4,596,205 | 6/1986 | Dunajtschik | 118/19 |
| 4,766,839 | 8/1988 | Dunajtschik | 118/19 |
| 4,785,759 | 11/1988 | Motoyama | 118/19 |

FOREIGN PATENT DOCUMENTS

| | | | |
|---|---|---|---|
| 131152 | 1/1985 | European Pat. Off. | 118/19 |
| 1-266000 | 10/1988 | Japan | 34/133 M |
| 1-204698 | 8/1989 | Japan | 34/133 N |

Primary Examiner—Peter Chin
Assistant Examiner—Todd J. Burns
Attorney, Agent, or Firm—Paul H. Gallagher

[57] ABSTRACT

A coating machine with counter-flow and parallel-flow air conduction is used for coating tablets, granules, pellets, dragees and the like with one or more coating compositions. The cores to be coated are arranged in a rotatably driven, perforated drum which includes an air conducting channel surrounding the drum at its outer periphery, which air channel is provided with air from an air supply fixed to the housing, with air streams differently directed into the drum. In order to provide an operationally reliable, positively controlled and easy-to-clean air distributor, an annular distributor plate is mounted rotatably on an annular flange fixed to the housing, the distributor plate having slots therein which are connected to the air connections of the air supply, and the annular flange is in turn connected in an airtight manner to the air conducting channel of the drum by part-annular chambers separate from each other.

8 Claims, 3 Drawing Sheets

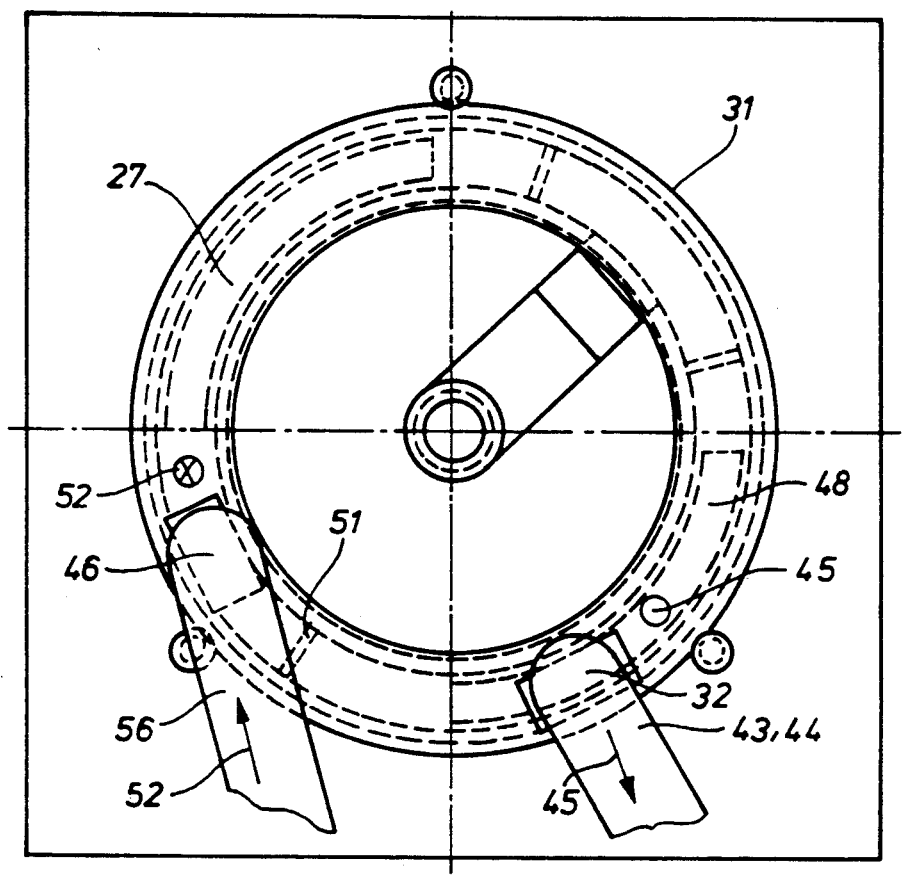
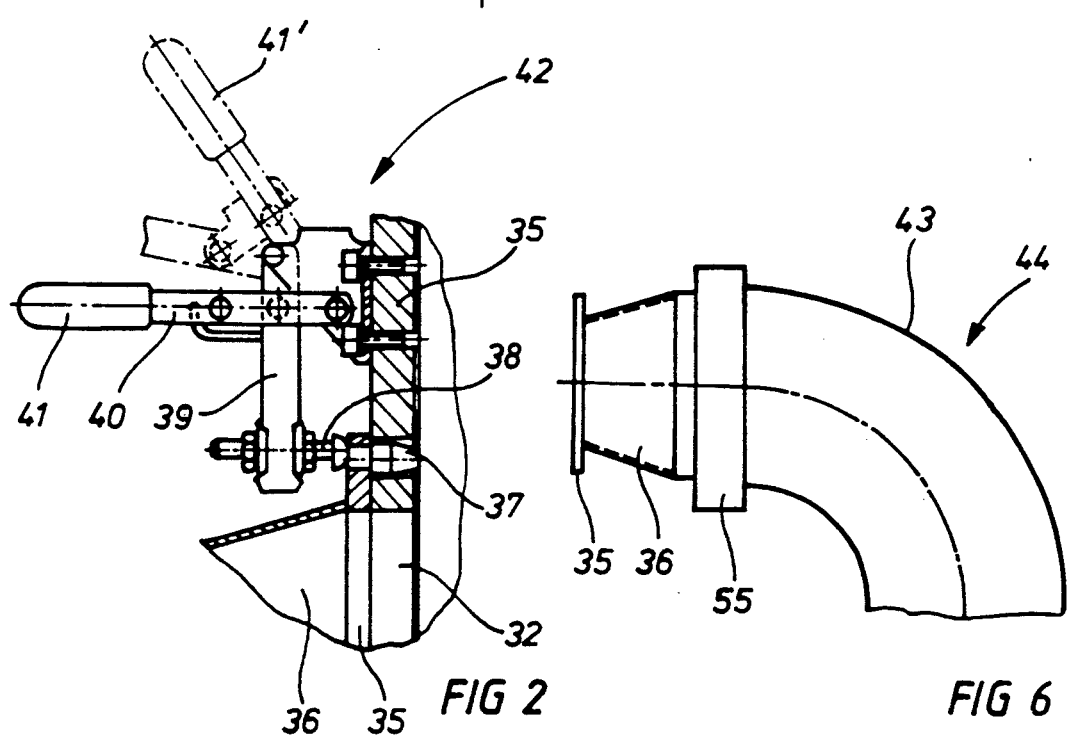

COATING MACHINE WITH A ROTATABLY DRIVEN PERFORATED DRUM

BACKGROUND OF THE INVENTION

1. Field of the Invention

This invention relates to a coating machine with counter-flow and parallel-flow air conduction for coating tablets, granules, pellets, dragees and the like with one or more coating compositions, of the type wherein the cores to be coated are arranged in a rotatably driven, perforated drum mounted on a housing which comprises an air conducting channel surrounding the drum at its outer periphery, which air channel is provided with air from an air supply fixed to a housing, with air streams differently directed into the drum, the drum further comprising a pivot bearing which is constructed as a hollow shaft and through which an additional axial air stream can be conducted out of the drum.

2. Description of the Prior Art

A coating machine of the aforementioned type is known in which counter-flow and parallel-flow air conduction takes place via an air distributor, which is rigidly installed in the housing on the rear side of the rotatable drum and in which air distribution for the purpose of counter-flow or parallel-flow conduction takes place by the switching of valves in the air distributor. Air conduction here takes place in a closed system without loss of air, and it is possible to switch from a parallel-flow drying process to a counter-flow one. In addition, extraction of air from the interior of the drum through the hollow shaft of the drum is known. For control of air conduction in the known coating machine, a total of at least three air valves are required, each of which must be driven accordingly. As a result, however, there arises the disadvantage of a relatively costly air distributor, and furthermore operational reliability in driving the valves cannot always be guaranteed, because there is no clear indication as to whether the valve has in actual fact been switched in the desired manner or not. Moreover, the air distributor itself and the air conducting channels of the housing and drum covered by the air distributor can be cleaned only with difficulty.

SUMMARY OF THE INVENTION

It is accordingly an object of the present invention to provide a coating machine with an air distributor of the aforementioned type in such a way that substantially cheaper manufacture of the air distributor is possible. It is a further object of the invention to provide such a device wherein air conduction is made operationally reliable and wherein the air distributor and the housing and drum parts covered by the air distributor are easy to clean.

These and other objects are attained in accordance with the invention by providing a coating machine of the aforementioned type wherein the air distributor for producing a parallel or counter air stream and for producing an axial air stream is constructed as an annular distributor plate which is mounted rotatably in front of a ring flange fixed to the housing, wherein the distributor plate comprises slots which are connected to the air connections and wherein the ring flange is in turn connected in an airtight manner to the air-conducting channel of the drum by ring chambers separate from each other.

An essential characteristic of the present invention is therefore that an air distributor without switchable valves is provided, while the air distributor essentially comprises an annular distributor plate which is constructed rotatably, so that by rotation of the distributor plate, the corresponding air inputs and outputs to the drum can be switched. As a result there is positive control of air conduction, without the need to drive different valves. The result of this is good operational reliability, for according to rotation of the rotatably mounted distributor plate, the required air conduction inevitably follows.

Because the air distributor is designed as an ordinary annular distributor plate, there is also the added advantage that this distributor plate is mounted easily and removably in the housing and that with removal of the distributor plate, the correspondingly arranged ring chambers on the housing side for air conduction and also the air conducting channels on the drum side are readily accessible for cleaning.

In a particularly preferred embodiment the air connections leading into the distributor plate are connected by quick-action fastenings to the distributor plate, so that when the distributor plate is dismantled, the air connections are easily removable by releasing the associated quick-action fastenings.

Throughout operation of the coating machine, however, the distributor plate remains in place and the air connections remain connected to the distributor plate, wherein it is provided that with rotation of the distributor plate, the air connections are rotatable in such a way (e.g by rotary couplings) that, without having to be removed, they perform each revolution of the distributor plate with it.

The result is a particularly simple and cheap air distributor system in which all three operating states are possible, namely either counter-flow air conduction (outgoing air from above, incoming air from below), parallel-flow air conduction (incoming air from above, outgoing air from below) or additional air extraction via the hollow shaft, namely outgoing air from the interior of the drum through the hollow shaft to the outside and incoming air from below into the charge of the drum.

BRIEF DESCRIPTION OF THE DRAWINGS

Further objects, characteristics and advantages of the invention will become apparent from the following detailed description thereof when read in conjunction with the accompanying drawings which illustrate a preferred embodiment thereof.

In the Drawings:

FIG. 2 shows a detail of FIG. 1, namely a section through a quick-action fastening;

FIG. 5 is a view similar to that of FIG. 3 during parallel-flow air conduction; and FIG. 6 is a side view of the air connecting branch of the machine shown in FIG. 1.

DETAILED DESCRIPTION OF THE PREFERRED EMBODIMENT

Figure 1:
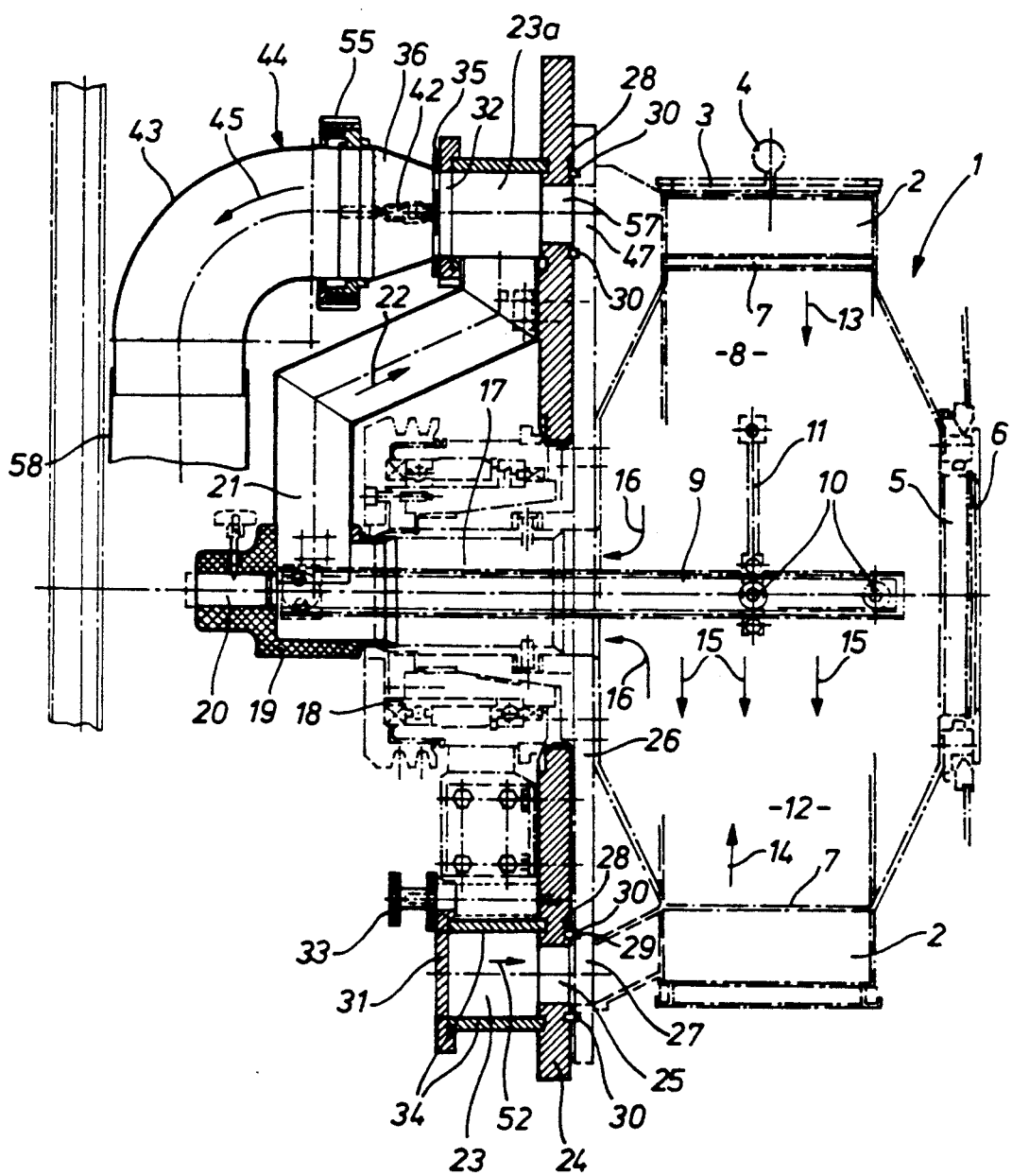
FIG. 1 shows schematically a section through a coating machine showing the directions of air conduction.

Referring first to FIG. 1, a drum 1 of a coating machine is mounted rotatably in a housing of the coating machine, which housing may be of a conventional type and is not shown in more detail, and rotationally driven by a drive mechanism, again not shown in more detail.

The drum is closed at the front (on the operating side of the coating machine) by a window 5 which closes the opening 6 of the drum 1.

In the interior 8 of the drum 1, the charge 12 is arranged near the bottom of the drum. The drum comprises perforated drum walls 7.

Around the outer periphery of the drum walls 7 is aranged a peripheral air conducting channel 2 which forms an annular chamber through which air streams are conducted into and out of the drum.

The air conducting channel 2 is closed at its radially outer end (at different surfaces of the periphery) in each case by a valve 3 which can be operated with a handle 4. The valve 3 is in this case mounted pivotably in the side walls of the air conducting channel 2.

In the interior 8 of the drum 1 are arranged one or more spray arms 9, the spray arm 9 carrying several nozzles 10 which are suitable for spraying a coating composition or a cleaning fluid in the direction of the arows 15 (spray jet).

Projecting perpendicularly from the spray arm 9 is arranged an additional arm 11 with additional spray nozzles.

According to the air conduction in the drum 1 selected by the air distributor, which will be described below, there can be either a flow 13 of air conduction parallel with the spray jet 15 or a counter-flow 14 of air conduction counter to the spray jet 15. In addition, extraction of air from the drum contents in the direction of the arrow 16 through the hollow shaft 17 of the drum 1 to the outside can be effected selectively.

The drum 1 is in this case mounted rotatably in a bearing 18 and is driven in rotation by the rotary drive mechanism. The spray arm 9 passes through the rotating hollow shaft 17 and can be fixed to the housing by insertion in a connection 20.

In the hollow shaft 17 there is sealingly engaged a stationary connecting branch 19 from which a connection piece 21 branches off perpendicularly, so that the air flowing out of the interior 8 of the drum 1 in the direction of the arrow 16 through the hollow shaft 17 is conducted in the direction of the arrow 22 through the connection piece 21 into an annular chamber 23 which is defined by an annular flange 34 fixed to the housing.

The annular flange 34 forms a self-contained annular chamber, and is accommodated on a stationary mounting plate 24. Between the mounting plate 24 and the rotating drum wall 26 is arranged a rotational seal, to allow air conduction out of the annular chamber 23 of the bearing flange 34 into the air conducting channel 2 of the drum 1.

The rotational seal in this case comprises two grooves 28 which are mutually spaced apart by a radial distance and opposite which are aligned grooves 29 in the region of the drum wall 26.

The two grooves 28, 29 mutually spaced apart by a radial distance are in each case filled with an annular seal 30.

Figure 3:
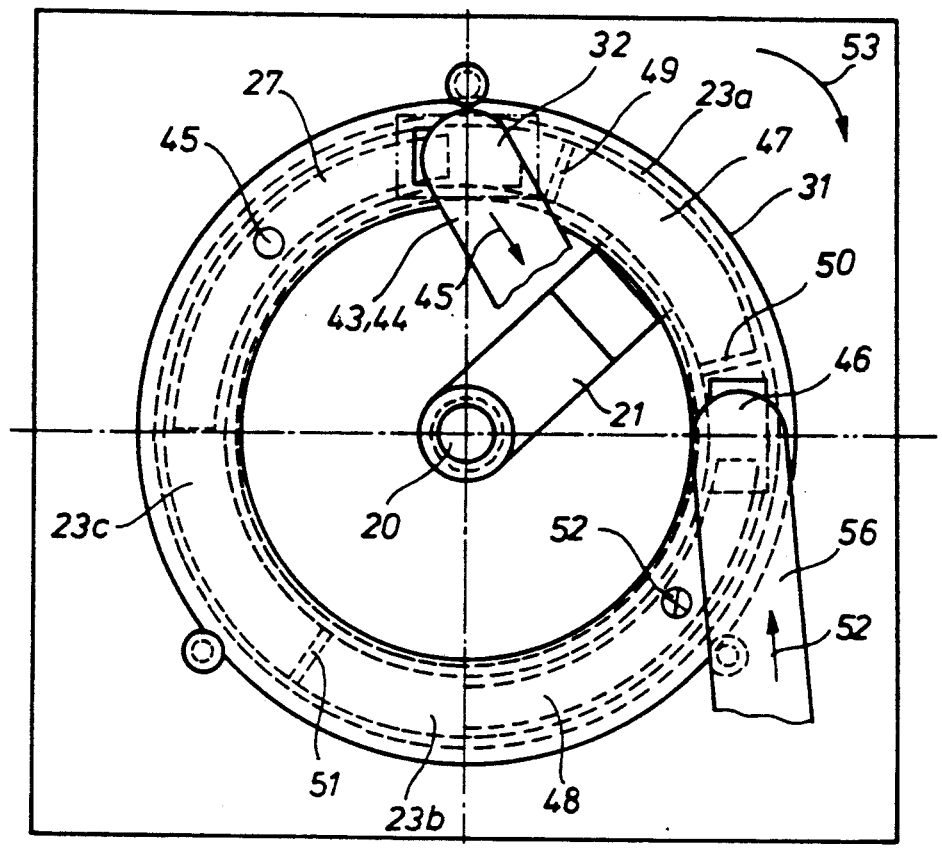
FIG. 3 is a view of the rear side of the air distributor system, showing the position of the air distributor during counter-flow air conduction.
Figure 4:
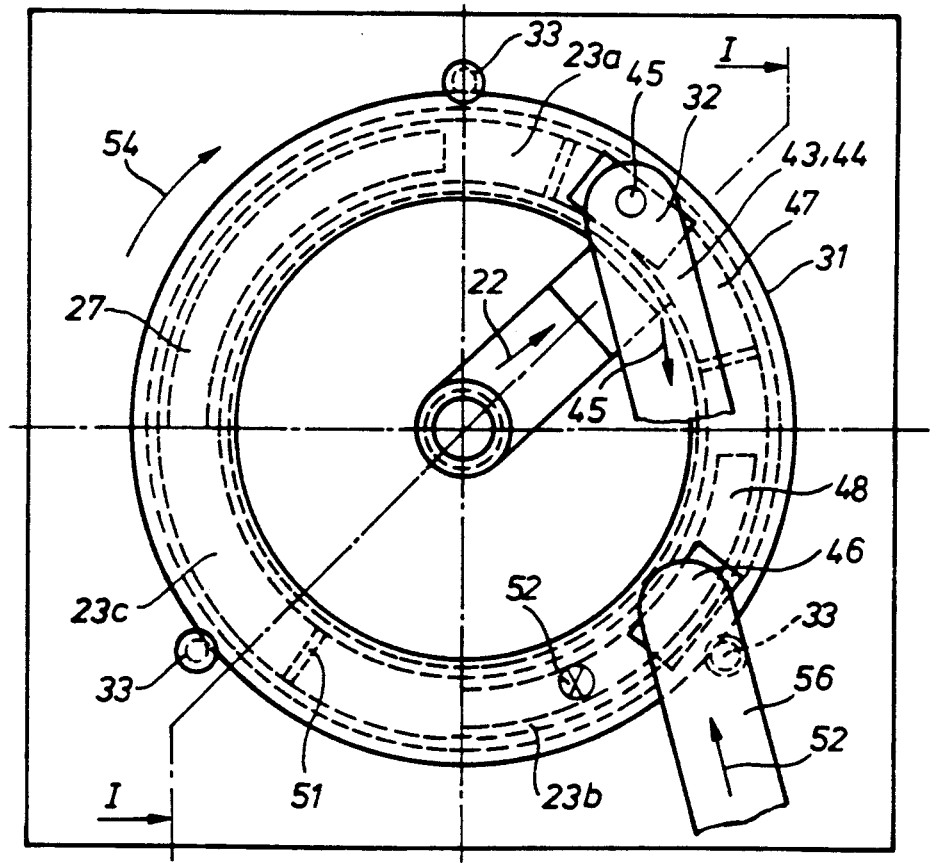
FIG. 4 is a view similar to that of FIG. 3 showing air extraction through the hollow shaft and supply of incoming air from below.

With reference to FIG. 1 in conjunction with FIGS. 3 to 5, it can be seen that the drum wall 26 is interrupted by part-annular slots 27, 47, 48 distributed around the periphery of the drum wall 26, each slot occupying only a given sector of the periphery.

Opposite and aligned with the slots 27, 47, 48 in the drum wall 26, slots 25, 57 are formed in the mounting plate 24.

On the other side of the mounting plate (in a direction towards the housing and facing away from the front side of the drum), the annular flange 34 described above is arranged, and forms part of the mounting plate 24. The annular flange 34 is divided into part-annular chambers 23a, 23b, 23c, which are separated from each other by dividing webs 49, 50, 51 distributed around the periphery of the annular flange, so that the part-annular chambers 23a–c are in the form of separate sectors.

Air supply to the annular chamber 23 takes place via the distributor plate 31 which covers the annular chamber 23 at the front as required or connects it in an airtight fashion to corresponding air inlets and outlets.

In the operating position of the distributor plate 31 shown in FIG. 3, incoming air is supplied in the direction of the arrow 52 to an air connection 56, so that the air passes through a slot 46 in the distributor plate 31 into the chamber 23b of the annular flange 34 and there passes through a slot 48 in the drum wall 26 into the lower air conducting channel 2 of the drum, so as to flow in the direction of the arrow 14 in counter-flow through the charge 12.

As FIG. 1 shows a section along the line I—I in FIG. 4, it can be seen from FIG. 4 that in this operating position the slot 27 has been cut in the wall of the drum 1, while in FIG. 3 an additional slot 48 (not visible in FIG. 1) is provided in the drum wall 26, so that there is an airtight connection of the air connection 56 into the lower air conducting channel 2.

At the same time the outgoing air is conducted away via the upper air conducting channel 2 out of the drum. This is achieved by the fact that in the drum wall on the upper side there is a slot 47 opposite which, in the position shown in FIG. 1, is aligned a slot 57 in the mounting plate 24. At the same time the distributor plate 31 also comprises a slot 32 in this region, so that an airtight connection passes from the upper air conducting channel 2 of the drum via the slots 47, 57, 32 into the air connection 44 adjoining this slot 32 in the distributor plate 31. The air thus flows in the direction of the arrow 45 out of this air connection 44.

Air extraction via the hollow shaft 17 does not take place in the configuration shown in FIG. 3, as the connection piece 21 leads into the part-annular chamber 23a and this chamber 23a is closed off by the dividing webs 49, 50 from the other part-annular chamber 23c, which is open in FIG. 3.

If the distributor plate 31 is rotated further in the direction of the arrow 53 (clockwise), then the slot 32 in the distributor plate 31 passes into the region of the chamber 23a for conducting away the outgoing air. The air extraction situation is then as shown in FIG. 1.

Since the connection piece 21 also leads into the chamber 23a (cf. FIG. 1), the air is conducted away both in the direction of the arrows 16, 22 out of the interior 8 of the drum and in the direction of the arrow 45 through the air connection 44 out of the chamber 23a.

At the same time incoming air is supplied in the direction of the arrow 52 through the lower air connection 56, wherein the slot 46 in the distributor plate 31 comes into register with the slot 48 in the drum wall 26, so that the air flows in the direction of the arrow 52 (FIG. 4) into the drum.

Thus, incoming air is supplied in counter-flow 14 from below as shown in FIG. 1.

If the distributor plate 31 is further rotated clockwise in the direction of rotation 54 as shown in FIG. 4, then the air conducting pattern shown in FIG. 5 arises.

In this position of the distributor plate 31 there is parallel-flow air conduction, because incoming air flows from above (parallel flow 13) and outgoing air from below (in the direction opposite the direction of the arrow 14 in FIG. 1).

In this case the air connection 56 which supplies the air in the direction of the arrow 52 has its slot 46 in the distributor plate 31 in register with the part-annular chamber 23c of the annular flange 34.

On the other hand, the outgoing air is conducted away in the direction of the arrow 45 through the open part-annular chamber 23b, so that the air flows away in the direction of the arrow 45 through the air connection 44. There is no air extraction through the hollow shaft 17 because the chamber 23c is hermetically sealed by the dividing webs 49, 50.

The distributor plate 31 is rotatably mounted as shown in FIGS. 1 and 3-5. At the outer periphery of the distributor plate 31 are arranged several knurled screws 33 which can be screwed into fixed threaded bores in the housing.

The knurled screw 33 is thus applied by its flange to the outer surface of the distributor plate 31, so that the distributor plate 31 can be pressed firmly against the faces of the annular flange 34 by tightening the respective knurled screws 33.

If the distributor plate 31 is to be turned in the direction of the arrows 53, 54, then the knurled screws 33 are slightly undone, as a result of which the distributor plate 31 can easily be turned together with the air connections 44, 56 mounted thereon. In this case it is not necessary to remove or reposition the air connections 44, 56, which results in a substantial saving of labour.

The air connections 44, 56 thus remain constantly connected to the distributor plate 31.

In order to make the distributor plate easily removable (e.g. for cleaning purposes), the air connections 44, 56 are mounted for easy removal on the distributor plate 31. So-called quick-action fastenings 42 are provided for this, which will be described in more detail with reference to FIGS. 1 and 2.

The upper air connection 44 comprises a pipe bend 43 which is mounted rotatably in a threaded connection piece 55. The threaded connection piece 55 is here rigidly attached to one end of a connecting branch 36, the other end of which is attached by the quick-action fastening 42, which will be described in more detail, and by a flange 35, to the distributor plate 31, overlapping the slot 32.

The mounting is in this case easily detachable by the toggle lever fastening shown in more detail in FIG. 2. This is a quick-action fastening, and is quite generally known by that designation. The toggle lever fastening essentially comprises a bolt 38 which is attached to the free front end of a lever 39, which lever is mounted pivotably in a bearing point on a second lever 40, which lever 40 is constructed as a clamping lever and has a handle 41.

In FIG. 2 is shown in dot-and-dash lines the clamping position of the lever 40 and in unbroken lines the open position of the lever 40.

In the clamping position, the bolt 38 presses firmly on the flange 35 of the connecting branch 36, so that the latter is pressed close against the distributor plate 31 in the edge region of the slot 32. Naturally, in this case several quick-action fastenings 42 distributed over the periphery are necessary to ensure that the flange 35 is seated sealingly and quickly removably on the distributor plate 31. A pin 37 is inserted in the distributor plate 31, which prevents the flange 35 from shifting.

The bend 43 then merges into a connecting hose 58.

On rotation of the distributor plate 31 in the direction of the arrows 53, 54, it may be provided that the threaded connection piece 55 must be slightly undone in order to ensure rotation of the bend 43 in the threaded connection piece 55.

The lower air connection 56 is also connected to the distributor plate 31 in an analogous manner.

FIG. 6 is a side view of this type of air connection 44.

It is important that by releasing the quick-action fastenings 42, the distributor plate 31 becomes free to the rear (in a direction towards the housing), so that it can be removed upwardly by undoing and completely removing the knurled screws 33 rearwardly (perpendicularly to the plane of the drawing in FIGS. 3-5). As a result the annular chamber 23, the mounting plate 24 with its slots fixed to the housing and also the drum wall 26 become freely accessible for cleaning purposes. Hence the air conducting channel 2 can easily be cleaned with all the slots and openings described above.

By corresponding rotation of the distributor plate 31 into the various operating positions shown in FIGS. 3-5, positive guiding of the air streams is always achieved without the need here to operate different valves, the position of which cannot be checked exactly. Air conduction which is particularly reliable in operation and which is designed particularly simply is therefore achieved.

With the simple rotary mounting of the distributor plate 31, it is also possible to drive the distributor plate in rotation with a motor. For this it is sufficient to provide, for example at the outer periphery of the distributor plate, corresponding teeth which mesh with a pinion of a drive motor, not shown in more detail. By driving the drive motor in both directions of rotation, therefore, the distributor plate can be rotated by electric motor into the various operating positions shown in FIGS. 3-5.

What is claimed is:

1. A coating machine for coating cores with at least one coating composition, said machine comprising,
   a housing,
   a coating drum for holding said cores, said drum being rotatably mounted on said housing, said drum having perforated peripheral walls and including a rotary bearing formed as a hollow axial shaft communicating with the inside of said drum for removal of an axial air stream therefrom,
   means within said drum for providing a flow of at least one coating composition for said cores and air supply means and distributor means for providing air flows parallel and countercurrently to said flow of coating composition, wherein said air supply means and distributor means comprises,
   an air conducting channel in said drum surrounding the perforated peripheral wall, said channel rotating with the drum,
   said air supply means being fixed to said housing,
   said air distributor means being operable for directing air between said air supply means and the drum via said channel in different streams in input direction and output direction respectively, as desired to provide parallel and countercurrent air streams, said air distributor means including an annular flange fixed relative to said housing, and an annular distributor plate rotatably mounted on said annular flange, said annular flange having circumferentially spaced dividing webs therein, and said distributor plate and housing, and the webs, together with the annular flange forming part-annular chambers in the annular flange, circumferentially spaced from one another, said distributor plate having slots therein connectable to said air supply by air connections and connectable to said part-annular chambers and said distributor plate forming an airtight closure to the annular flange, and thereby establishing passage through the annular flange from the air supply means to the air conducting channel of the drum.

2. A coating machine as claimed in claim 1, and including, a rotational seal forming an air tight connection between the housing and the air conducting channel around the drum periphery.

3. A coating machine as claimed in claim 1 wherein said air connections are attached to the distributor plate by quick-action fastenings.

4. A coating machine as claimed in claim 1 wherein each said air connection is attached rotatably to the distributor plate.

5. A coating machine as claimed in claim 1 wherein the hollow shaft of the drum is attached at its end outside the drum to a stationary connecting branch which forms an airtight connection via the hollow shaft to the interior of the drum further forms an airtight connection via a connection piece to said annular chamber.

6. A coating machine as claimed in claim 1 wherein the distributor plate is mounted at its outer periphery on knurled screws arranged at the periphery of the distributor plate to provide a rotational mounting.

7. A coating machine as claimed in claim 1 further comprising a motor arranged to drive the distributor plate in rotation.

8. A coating machine as claimed in claim 2 wherein said annular flange defines three part-annular chambers which are separated from each other by dividing webs and are connected in an airtight manner by the rotational seal to the air conducting channel surrounding the drum.

* * * * *